United States Patent
Kato et al.

(10) Patent No.: US 11,795,110 B2
(45) Date of Patent: Oct. 24, 2023

(54) ZIRCONIA PRE-SINTERED BODY SUITABLE FOR DENTAL USE

(71) Applicant: KURARAY NORITAKE DENTAL INC., Kurashiki (JP)

(72) Inventors: Shinichiro Kato, Aichi (JP); Yoshihisa Ito, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 535 days.

(21) Appl. No.: 16/957,924

(22) PCT Filed: Dec. 26, 2018

(86) PCT No.: PCT/JP2018/047904
§ 371 (c)(1),
(2) Date: Jun. 25, 2020

(87) PCT Pub. No.: WO2019/131782
PCT Pub. Date: Jul. 4, 2019

(65) Prior Publication Data
US 2021/0061715 A1    Mar. 4, 2021

(30) Foreign Application Priority Data
Dec. 26, 2017  (JP) ................. 2017-250155

(51) Int. Cl.
| | | |
|---|---|---|
| *C04B 35/486* | (2006.01) | |
| *A61C 13/083* | (2006.01) | |
| *A61C 13/00* | (2006.01) | |

(52) U.S. Cl.
CPC ........ *C04B 35/486* (2013.01); *A61C 13/0022* (2013.01); *A61C 13/083* (2013.01);
(Continued)

(58) Field of Classification Search
None
See application file for complete search history.

(56) References Cited

U.S. PATENT DOCUMENTS

| 2010/0291509 A1 | 11/2010 | Berggren et al. |
| 2014/0328746 A1 | 11/2014 | Yamada et al. |

(Continued)

FOREIGN PATENT DOCUMENTS

| CN | 104844200 A | 8/2015 |
| EP | 3 006 418 A1 | 4/2016 |

(Continued)

OTHER PUBLICATIONS

International Search Report dated Mar. 12, 2019 in PCT/JP2018/047904 filed on Dec. 26, 2018, 2 pages.

(Continued)

*Primary Examiner* — Mohammad M Ameen
(74) *Attorney, Agent, or Firm* — Oblon, McClelland, Maier & Neustadt, L.L.P.

(57) ABSTRACT

The present invention provides a zirconia pre-sintered body that develops the preferable shade with a short firing time. The present invention relates to a zirconia pre-sintered body comprising zirconia that comprises predominantly monoclinic, and a stabilizer capable of inhibiting a phase transformation of zirconia, the zirconia pre-sintered body satisfying the following conditions:

L1, a1, b1, L2, a2, and b2 are confined within predetermined ranges,
L1>L2,
a1<a2, and
b1<b2,
where (L1,a1,b1) represent values of (L*,a*,b*) of the L*a*b* color system after sintering as measured at a first point falling within an interval of a length from one end of the zirconia pre-sintered body to 25% of the entire length of a straight line extending along a first direction from one end to the other end of the zirconia pre-sintered body, and (L2,a2,b2) represent values of (L*,a*,b*) after sintering as (Continued)

measured at a second point falling within an interval of a length from the other end of the zirconia pre-sintered body to 25% of the entire length of the straight line, and the values of (L*,a*,b*) after sintering show unchanging patterns of increase and decrease in a direction from the first point to the second point.

13 Claims, 3 Drawing Sheets

(52) U.S. Cl.
CPC ............... *C04B 2235/3225* (2013.01); *C04B 2235/9661* (2013.01); *Y10T 428/12229* (2015.01)

(56) References Cited

U.S. PATENT DOCUMENTS

| | | | |
|---|---|---|---|
| 2016/0074142 A1* | 3/2016 | Yamada | B32B 5/30 264/72 |
| 2017/0143458 A1* | 5/2017 | Fujisaki | C04B 35/64 |

FOREIGN PATENT DOCUMENTS

| | | | | |
|---|---|---|---|---|
| EP | 3 214 057 | A1 | 9/2017 | |
| EP | 3214057 | A1 * | 9/2017 | ......... A61C 13/0022 |
| EP | 3 246 300 | A1 | 11/2017 | |
| EP | 3246300 | A1 * | 11/2017 | ........... A61C 13/082 |
| JP | 2010-528731 | A | 8/2010 | |
| JP | 2017-127431 | A | 7/2017 | |
| WO | WO 2008/148495 | A1 | 12/2008 | |
| WO | WO 2014/181828 | A1 | 11/2014 | |
| WO | WO 2015/199018 | A1 | 12/2015 | |

OTHER PUBLICATIONS

Extended European Search Report dated Aug. 19, 2021 in European Patent Application No. 18897850.6, 8 pages.

* cited by examiner

ZIRCONIA PRE-SINTERED BODY SUITABLE FOR DENTAL USE

TECHNICAL FIELD

The present invention relates to a zirconia pre-sintered body. The present invention also relates to methods for producing a zirconia sintered body and a dental product made from the zirconia pre-sintered body.

BACKGROUND ART

Zirconia is a compound that undergoes a phase transformation between crystal systems. Partially stabilized zirconia (PSZ) and fully stabilized zirconia, which are used in a wide variety of fields, inhibit such phase transformations with a stabilizer, such as yttria (yttrium oxide; $Y_2O_3$), dissolved in zirconia as a solid solution.

In dentistry, zirconia materials have been used mostly in frame applications because of their low translucency, though zirconia materials are high in strength. The improved translucency of more recent zirconia materials has prompted fabrication of dental prostheses solely made of zirconia. Patent Literature 1 discloses a high-translucency colored zirconia sintered body suited for dental use (particularly for front teeth).

The colored translucent zirconia sintered body described in Patent Literature 1 is fabricated by sintering a press-molded body of a zirconia powder at 1,450° C. with a rate of temperature increase of 600° C./hr and 2-hour retention time. The zirconia powder comprises more than 4.0 mol % and at most 6.5 mol % yttria, and less than 0.1 wt % alumina, and has a BET specific surface area of 8 to 15 $m^2/g$, an average particle diameter of 0.40 to 0.50 μm, and a total crystallographic tetragonal and cubical fraction of 80% or more.

CITATION LIST

Patent Literature

Patent Literature 1: WO 2015/199018 A1

SUMMARY OF INVENTION

Technical Problem

Traditionally, fabrication of all-zirconia dental prostheses is usually performed at dental laboratories. However, it is becoming increasing popular to more conveniently make such dental prostheses at the dental clinic. In this case, firing of zirconia needs to be completed in a short time period.

In the method for the production of the zirconia sintered body described in Patent Literature 1, the highest temperature is retained for 2 hours, and the method requires a total of about 7 to 8 hours to complete the entire firing process, including cooling. When the colored translucent zirconia sintered body of the related art is used for the fabrication of a dental prosthesis, a patient in need of a treatment with a dental prosthesis cannot receive the treatment on the day of visit, and needs to revisit the clinic at a later date. Another shortcoming is that the colored translucent zirconia sintered body, when the retention time at the highest temperature is short, develops cloudiness and low translucency, and is unable to reproduce the preferable shade as a dental product.

Accordingly, a zirconia pre-sintered body is needed that can be fired into a sintered body that develops the shade suited for dental use (particularly, at the dental clinic), even with a short firing time. There is also a need for a zirconia pre-sintered body that can be fired into a sintered body with maintained translucency, even when the firing time is short.

Solution to Problem

The present inventors conducted intensive studies to find a solution to the foregoing issues, and found that the problems can be solved with a zirconia pre-sintered body that comprises predominantly monoclinic and having layers satisfying appropriately set $L^*a^*b^*$ values after firing. The present invention was completed after further studies based on this finding.

Specifically, the present invention includes the following.

[1] A zirconia pre-sintered body comprising:
zirconia; and
a stabilizer capable of inhibiting a phase transformation of zirconia,
the zirconia comprising predominantly monoclinic, and the zirconia pre-sintered body satisfying the following conditions:
L1 is 68.0 or more and 90.0 or less,
a1 is −3.0 or more and 4.5 or less,
b1 is 0.0 or more and 24.0 or less,
L2 is 60.0 or more and 85.0 or less,
a2 is −2.0 or more and 7.0 or less,
b2 is 4.0 or more and 28.0 or less,
L1>L2,
a1<a2,
b1<b2,
where (L1,a1,b1) represent values of $(L^*,a^*,b^*)$ of the $L^*a^*b^*$ color system after sintering as measured at a first point falling within an interval of a length from one end of the zirconia pre-sintered body to 25% of the entire length of a straight line extending along a first direction from one end to the other end of the zirconia pre-sintered body, and (L2,a2,b2) represent values of $(L^*,a^*,b^*)$ of the $L^*a^*b^*$ color system after sintering as measured at a second point falling within an interval of a length from the other end of the zirconia pre-sintered body to 25% of the entire length of the straight line, and
the values of $(L^*,a^*,b^*)$ of the $L^*a^*b^*$ color system after sintering show unchanging patterns of increase and decrease in a direction from the first point to the second point.

[2] The zirconia pre-sintered body according to [1], wherein L1−L2 is more than 0 and 12.0 or less, a2−a1 is more than 0 and 6.0 or less, and b2−b1 is more than 0 and 12.0 or less.

[3] The zirconia pre-sintered body according to [1] or [2], wherein L1−L2 is more than 0 and 8.0 or less, a2−a1 is more than 0 and 5.0 or less, and b2−b1 is more than 0 and 10.0 or less.

[4] The zirconia pre-sintered body according to any one of [1] to [3], wherein L1−L2 is 1.0 or more and 7.0 or less, a2−a1 is 0.5 or more and 3.0 or less, and b2−b1 is 1.6 or more and 6.5 or less.

[5] The zirconia pre-sintered body according to any one of [1] to [4], wherein the zirconia pre-sintered body on a straight line connecting the first point and the second point comprises no interval in which the $L^*$ value increases by 1 or more in a direction from the first point to the second point after sintering, no interval in which the $a^*$ value decreases by 1 or more in a direction from the first point to the second point after sintering, and no interval in which the b* value decreases by 1 or more in a direction from the first point to the second point after sintering.

[6] The zirconia pre-sintered body according to any one of [1] to [5], wherein the zirconia pre-sintered body satisfies the following conditions:
L3 is 66.0 or more and 89.0 or less,
a3 is −2.5 or more and 6.0 or less,
b3 is 1.5 or more and 25.0 or less,
L1>L3>L2,
a1<a3<a2, and
b1<b3<b2,
where (L3,a3,b3) represent values of (L*,a*,b*) of the L*a*b* color system after sintering as measured at a third point lying between the first point and the second point on a straight line connecting the first point to the second point.

[7] The zirconia pre-sintered body according to [6], wherein the zirconia pre-sintered body satisfies the following conditions:
L4 is 62.0 or more and 86.0 or less,
a4 is −2.2 or more and 7.0 or less,
b4 is 3.5 or more and 27.0 or less,
L1>L3>L4>L2,
a1<a3<a4<a2, and
b1<b3<b4<b2,
where (L4,a4,b4) represent values of (L*,a*,b*) of the L*a*b* color system after sintering as measured at a fourth point lying between the third point and the second point on a straight line connecting the first point to the second point.

[8] The zirconia pre-sintered body according to [7], wherein the third point is distance away from said one end by a distance of 45% of the entire length, and the fourth point is distance away from said one end by a distance of 55% of the entire length.

[9] The zirconia pre-sintered body according to any one of [1] to [8], wherein the zirconia comprises at least 55% monoclinic.

[10] The zirconia pre-sintered body according to any one of [1] to [9], wherein at least a part of the stabilizer is undissolved in zirconia as a solid solution.

[11] The zirconia pre-sintered body according to any one of [1] to [10], wherein the zirconia pre-sintered body has a density of 2.7 to 4.0 g/cm³.

[12] The zirconia pre-sintered body according to any one of [1] to [11], wherein the zirconia pre-sintered body has a flexural strength of 15 to 70 MPa.

[13] The zirconia pre-sintered body according to any one of [1] to [12], wherein the zirconia pre-sintered body further comprises a pigment, the pigment being an oxide of at least one element selected from the group consisting of Ti, V, Cr, Mn, Fe, Co, Ni, Zn, Y, Zr, Sn, Sb, Bi, Ce, Pr, Sm, Eu, Gd, and Tb, and the zirconia pre-sintered body does not comprise erbium oxide.

[14] The zirconia pre-sintered body according to any one of [1] to [13], wherein the stabilizer is yttria.

[15] The zirconia pre-sintered body according to [14], wherein the zirconia pre-sintered body comprises the yttria in an amount of 3 to 7.5 mol % relative to the total mole of the zirconia and the yttria.

[16] The zirconia pre-sintered body according to [14] or [15], wherein the zirconia pre-sintered body has an X-ray diffraction pattern with a yttria peak.

[17] The zirconia pre-sintered body according to any one of [14] to [16], wherein the zirconia pre-sintered body has a fraction $f_y$ of more than 0 as calculated from the following mathematical expression (1),

[Math. 1]

$$f_y(\%) = \frac{I_y(111)}{I_y(111) + I_m(111) + I_m(11-1) + I_t(111) + I_c(111)} \times 100 \quad (1)$$

where $I_y(111)$ represents the peak intensity of the (111) plane of yttria in the vicinity of 2θ=29° in an X-ray diffraction pattern using CuKα radiation, $I_m(111)$ and $I_m(11-1)$ represent the peak intensities of the (111) plane and (11-1) plane, respectively, of the monoclinic crystal system of zirconia in the X-ray diffraction pattern, $I_t(111)$ represents the peak intensity of the (111) plane of the tetragonal crystal system of zirconia in the X-ray diffraction pattern, and $I_c(111)$ represents the peak intensity of the (111) plane of the cubical crystal system of zirconia in the X-ray diffraction pattern.

[18] The zirconia pre-sintered body according to [17], wherein the fraction $f_y$ is 15% or less.

[19] The zirconia pre-sintered body according to [17] or [18], wherein the zirconia pre-sintered body has a yttria content of 3 mol % or more and less than 4.5 mol %, and the fraction $f_y$ is 0.5% or more.

[20] The zirconia pre-sintered body according to [17] or [18], wherein the zirconia pre-sintered body has a yttria content of 4.5 mol % or more and less than 5.8 mol %, and the fraction $f_y$ is 1% or more.

[21] The zirconia pre-sintered body according to [17] or [18], wherein the zirconia pre-sintered body has a yttria content of 5.8 mol % or more and 7.5 mol % or less, and the fraction $f_y$ is 2% or more.

[22] The zirconia pre-sintered body according to any one of [1] to [21], wherein a first sintered body fabricated by firing the zirconia pre-sintered body at a suitable firing temperature for 30 minutes has a first translucency that is at least 85% of a second translucency of a second sintered body fabricated by firing the zirconia pre-sintered body at said suitable firing temperature for 120 minutes.

[23] The zirconia pre-sintered body according to any one of [1] to [22], wherein a first sintered body fabricated by firing the zirconia pre-sintered body at a suitable firing temperature for 15 minutes has a first translucency that is at least 85% of a second translucency of a second sintered body fabricated by firing the zirconia pre-sintered body at said suitable firing temperature for 120 minutes.

[24] A method for producing the zirconia pre-sintered body of any one of [1] to [23], comprising calcining at 800° C. to 1,200° C. of a zirconia molded body formed from a raw material powder containing zirconia particles and a stabilizer.

[25] A method for producing a zirconia sintered body, comprising firing the zirconia pre-sintered body of any one of [1] to [23] at a maximum firing temperature of 1,400° C. to 1,600° C.

[26] The method according to [25], wherein the zirconia pre-sintered body is retained at the maximum firing temperature for less than 120 minutes.

[27] A method for producing a dental product, comprising sintering the zirconia pre-sintered body of any one of [1] to [23] after milling the zirconia pre-sintered body.

[28] The method according to [27], wherein the zirconia pre-sintered body is sintered after being milled with a CAD/CAM system.

Advantageous Effects of Invention

The present invention can provide a zirconia pre-sintered body that can be fired into a sintered body that develops the shade suited for dental use (particularly, at the dental clinic), even with a short firing time. The present invention can also provide a zirconia pre-sintered body that can be fired into a sintered body with maintained translucency, even when the firing time is short.

DESCRIPTION OF EMBODIMENTS

A zirconia pre-sintered body of the present invention is described below. The zirconia pre-sintered body is a body that can be a precursor (intermediate product) of a zirconia sintered body. In the present invention, the zirconia pre-sintered body may be, for example, a zirconia pre-sintered body that has turned into a block with incompletely sintered zirconia particles (powders). The zirconia pre-sintered body has a density of preferably 2.7 g/cm$^3$ or more. The zirconia pre-sintered body has a density of preferably 4.0 g/cm$^3$ or less, more preferably 3.8 g/cm$^3$ or less, even more preferably 3.6 g/cm$^3$ or less. The zirconia pre-sintered body can be formed with ease when the density is confined within these ranges.

A zirconia pre-sintered body of the present invention comprises zirconia, and a stabilizer capable of inhibiting a phase transformation of zirconia. The stabilizer is preferably one capable of forming partially stabilized zirconia. Examples of the stabilizer include oxides, for example, such as calcium oxide (CaO), magnesium oxide (MgO), yttria, cerium oxide (CeO$_2$), and scandium oxide (Sc$_2$O$_3$). The content of the stabilizer in a zirconia pre-sintered body of the present invention, and the content of the stabilizer in a sintered body of a zirconia pre-sintered body of the present invention can be measured using a technique, for example, such as inductively coupled plasma (ICP) emission spectral analysis or x-ray fluorescence analysis. The content of the stabilizer in a zirconia pre-sintered body of the present invention and in a sintered body of a zirconia pre-sintered body of the present invention is preferably 0.1 to 18 mol %, more preferably 1 to 15 mol % relative to the total mole of the zirconia and the stabilizer.

In a zirconia pre-sintered body of the present invention, the zirconia needs to be predominantly monoclinic. In the present invention, "predominantly monoclinic" means that the fraction $f_m$ of the monoclinic crystal system of zirconia is at least 50% of the total amount of all crystal systems of zirconia (the monoclinic system, the tetragonal system, and the cubical system) as calculated from the mathematical expression (2) below. In a zirconia pre-sintered body of the present invention, the fraction $f_m$ of the monoclinic system in zirconia calculated from the mathematical expression (2) below is preferably 55% or more, more preferably 60% or more, even more preferably 70% or more, yet more prefer-ably 75% or more, particularly preferably 80% or more, more particularly preferably 85% or more, most preferably 90% or more relative to the total amount of the monoclinic, tetragonal, and cubical crystal systems. The fraction $f_m$ of monoclinic system can be calculated from the mathematical expression (2) below, using peaks in an X-ray diffraction (XRD) pattern by CuKα radiation. It is to be noted that the predominant crystal system in the zirconia pre-sintered body has possible contribution to the increased contraction temperature and the reduced sintering time.

In a zirconia pre-sintered body of the present invention, the peaks of tetragonal crystals and cubical crystals may be essentially undetectable. That is, the monoclinic system may have a fraction $f_m$ of 100%.

[Math. 2]

$$f_m(\%) = \frac{I_m(111) + I_m(11-1)}{I_m(111) + I_m(11-1) + I_t(111) + I_c(111)} \times 100 \quad (2)$$

In mathematical expression (2), $I_m(111)$ and $I_m(11-1)$ represent the peak intensities of the (111) plane and (11-1) plane, respectively, of the monoclinic crystal system of zirconia. $I_t(111)$ represents the peak intensity of the (111) plane of the tetragonal crystal system of zirconia. $I_c(111)$ represents the peak intensity of the (111) plane of the cubical crystal system of zirconia.

In a zirconia pre-sintered body of the present invention, it is preferable that at least a part of the zirconia crystals exist as monoclinic crystals by the presence of the stabilizer. To be more specific, it is preferable that at least a part of the stabilizer be present in an undissolved form in zirconia as a solid solution. Whether or not the stabilizer is at least partly dissolved in zirconia as a solid solution can be confirmed by an XRD pattern, for example. The presence of a peak derived from the stabilizer in an XRD pattern of the zirconia pre-sintered body means that the zirconia pre-sintered body is containing a stabilizer that is not dissolved in zirconia as a solid solution. A peak derived from the stabilizer is basically not observable in an XRD pattern when the stabilizer has fully dissolved as a solid solution. It is, however, possible, depending on the crystal state or other conditions of the stabilizer, that the stabilizer may not be dissolved in zirconia as a solid solution even when the stabilizer does not produce a peak in the XRD pattern. The stabilizer can be thought of having dissolved in zirconia as a solid solution for the most part (basically completely) when zirconia is predominantly tetragonal and/or cubical, and there is no peak attributed to the stabilizer in the XRD pattern. In a zirconia pre-sintered body of the present invention, it is not required to fully dissolve the stabilizer in zirconia as a solid solution. In the present invention, "to dissolve the stabilizer as a solid solution" means that, for example, the elements (atoms) contained in the stabilizer are dissolved in zirconia as a solid solution.

The stabilizer is preferably yttria in view of the strength and translucency of a zirconia sintered body fabricated from a zirconia pre-sintered body of the present invention. The yttria content is preferably 3 mol % or more, more preferably 3.5 mol % or more, even more preferably 4.0 mol % or more relative to the total mole of zirconia and yttria. The translucency of the zirconia sintered body can increase with a yttria content of 3 mol % or more. The yttria content is preferably 7.5 mol % or less, more preferably 7.0 mol % or less, even more preferably 6.5 mol % or less, particularly preferably 6.0 mol % or less relative to the total mole of zirconia and yttria. Decrease of the strength of the zirconia sintered body can be reduced with a yttria content of 7.5 mol % or less.

In a zirconia pre-sintered body of the present invention, the percentage presence $f_y$ of yttria not dissolved in zirconia as a solid solution (hereinafter, referred to also as "undissolved yttria") can be calculated from the mathematical expression (1) below. The percentage presence $f_y$ of undissolved yttria is preferably more than 0%, more preferably 1% or more, even more preferably 2% or more. The upper limit of the percentage presence $f_y$ of undissolved yttria may be, for example, 15% or less. However, preferably, the upper limit of the percentage presence $f_y$ of undissolved yttria depends on the yttria content of the zirconia pre-sintered body. The percentage presence $f_y$ may be 7% or less for a yttria content of 3 mol % or more and less than 4.5 mol %. The percentage presence $f_y$ may be 11% or less for a yttria content of 4.5 mol % or more and less than 5.8 mol %. The percentage presence $f_y$ may be 15% or less for a yttria content of 5.8 mol % or more and less than 7.5 mol %.

In a zirconia pre-sintered body of the present invention, the percentage presence $f_y$ is preferably 0.5% or more, more preferably 1.0% or more, even more preferably 2.0% or more for a yttria content of 3 mol % or more and less than 4.5 mol %. The percentage presence $f_y$ is preferably 1% or more, more preferably 2% or more, even more preferably 3% or more for a yttria content of 4.5 mol % or more and less than 5.8 mol %. The percentage presence $f_y$ is preferably 2% or more, more preferably 3% or more, even more preferably 4% or more for a yttria content of 5.8 mol % or more and 7.5 mol % or less. In a zirconia pre-sintered body of the present invention, the ratio $f_m/f_y$ is preferably 20 to 200, more preferably 25 to 100, even more preferably 30 to 60 for a yttria content of 3 mol % or more and less than 4.5 mol %. The ratio $f_m/f_y$ is preferably 5 to 45, more preferably 10 to 40, even more preferably 15 to 35 for a yttria content of 4.5 mol % or more and less than 5.8 mol %. The ratio $f_m/f_y$ is preferably 2 to 40, more preferably 5 to 35, even more preferably 10 to 30 for a yttria content of 5.8 mol % or more and 7.5 mol % or less.

[Math. 1]

$$f_y(\%) = \frac{I_y(111)}{I_y(111) + I_m(111) + I_m(11-1) + I_t(111) + I_c(111)} \times 100 \quad (1)$$

In mathematical expression (1), $I_y(111)$ represents the peak intensity of the (111) plane of yttria in the vicinity of 2θ=29° in an XRD pattern using CuKα radiation. $I_m(111)$ and $I_m(11-1)$ represent the peak intensities of the (111) plane and (11-1) plane, respectively, of the monoclinic crystal system of zirconia. $I_t(111)$ represents the peak intensity of the (111) plane of the tetragonal crystal system of zirconia. $I_c(111)$ represents the peak intensity of the (111) plane of the cubical crystal system of zirconia.

The mathematical expression (1) is also applicable to calculations of the percentage presence of undissolved stabilizers as a solid solution other than yttria by substituting other peaks for $I_y(111)$.

In order to ensure the strength needed for mechanical working, a zirconia pre-sintered body of the present invention has a flexural strength of preferably 15 MPa or more.

For ease of mechanical working, the flexural strength of the pre-sintered body is preferably 70 MPa or less, more preferably 60 MPa or less.

The flexural strength can be measured in compliance with ISO 6872:2015 (Dentistry-Ceramic materials), and the measurement is made using the same conditions, except for the specimen size, specifically, by using a specimen measuring 5 mm×10 mm×50 mm in size. The surface of the specimen, and the C surface (a surface created by chamfering a corner of the specimen at a 45° angle) are longitudinally finished with #600 sandpaper. The specimen is disposed in such an orientation that the widest surface is vertically situated (loading direction). In the three-point flexural measurement, the distance between supports (span) is 30 mm, and the crosshead speed is 0.5 mm/min.

A zirconia pre-sintered body of the present invention may comprise an additive or additives other than zirconia and the stabilizer, provided that the present invention can exhibit its effects. Examples of such additives include colorants (including pigments, complex pigments, and fluorescent agents), alumina ($Al_2O_3$), titanium oxide ($TiO_2$), and silica ($SiO_2$).

Examples of the pigments include oxides of at least one element selected from the group consisting of Ti, V, Cr, Mn, Fe, Co, Ni, Zn, Y, Zr, Sn, Sb, Bi, Ce, Pr, Sm, Eu, Gd, Tb, and Er (specifically, for example, NiO, $Cr_2O_3$), preferably oxides of at least one element selected from the group consisting of Ti, V, Cr, Mn, Fe, Co, Ni, Zn, Y, Zr, Sn, Sb, Bi, Ce, Pr, Sm, Eu, Gd, and Tb, more preferably oxides of at least one element selected from the group consisting of Ti, V, Cr, Mn, Fe, Co, Ni, Zn, Y, Zr, Sn, Sb, Bi, Ce, Sm, Eu, Gd, and Tb. A zirconia pre-sintered body of the present invention may be one that does not comprise erbium oxide ($Er_2O_3$). Examples of the complex pigments include $(Zr,V)O_2$, $Fe(Fe,Cr)_2O_4$, $(Ni,Co,Fe)(Fe,Cr)_2O_4 \cdot ZrSiO_4$, and $(Co,Zn)Al_2O_4$. Examples of the fluorescent agents include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, and $BaMgAl_{10}O_{17}$:Eu.

A zirconia pre-sintered body of the present invention can be produced, for example, as follows. First, a raw material powder is produced. A monoclinic zirconia powder and a stabilizer powder (for example, a yttria powder) are used to make a mixture of a desired stabilizer (for example, yttria) content. The mixture is added to water to prepare a slurry, and pulverized and mixed wet with a ball mill until the desired particle size is achieved. After pulverization, the slurry is dried to granulate, using a spray dryer. The resulting powder is then fired into a primary powder at a temperature (for example, 800 to 1,200° C.) that does not sinter the zirconia particles. The primary powder is divided into at least two groups (preferably four groups). The following example divides the primary powder into four groups. A pigment is added to each of first to fourth powders. A pigment may be added to only one or some of the powder groups so that the pigment content will be different for the different powder groups. After adding the pigment, each powder is added to water to prepare a slurry, and pulverized and mixed wet with a ball mill until the desired particle size is achieved. After pulverization, an additive, such as a binder, is optionally added to the slurry, and the slurry is dried with a spray dryer to produce secondary powders of first to fourth powders. The secondary powder of first powder is charged into a predetermined die, and, after leveling the surface to provide a flat surface, the second powder is charged onto the first powder. After leveling the surface of the second powder, the third powder is charged onto the second powder, and the surface is leveled to provide a flat surface. The fourth powder is then charged onto the third powder, and the surface is leveled. Finally, with the upper die set on the powders, the powders are subjected to primary pressing using a uniaxial pressing machine, and the resulting primary press-molded body is formed into a molded body of a four-layer structure by CIP. A pre-sintered body can then be obtained by firing the molded body at a temperature that does not sinter the zirconia particles.

A zirconia pre-sintered body of the present invention can be fabricated by a method whereby a zirconia molded body made from a raw material powder containing zirconia particles and a stabilizer is fired (i.e., pre-sintered) at a temperature that does not sinter the zirconia particles (pre-sintering). In order to ensure formation of a block, the calcining temperature is, for example, preferably 800° C. or more, more preferably 900° C. or more, even more preferably 950° C. or more. For improved dimensional accuracy, the firing temperature is, for example, preferably 1,200° C. or less, more preferably 1,150° C. or less, even more preferably 1,100° C. or less. That is, the firing temperature is preferably 800° C. to 1,200° C. in a method of production of a zirconia pre-sintered body of the present invention. Firing should not drive the dissolution of the stabilizer as a solid solution with the firing temperature falling in this range.

A zirconia pre-sintered body of the present invention may be a molded body of a predetermined shape. For example, the zirconia pre-sintered body may be disc-shaped (circular disc) or cuboidal, or may have a shape of a dental product (for example, a shape of a crown). The pre-sintered body is also inclusive of a dental product (for example, a crown-shaped prosthesis) made from a calcined zirconia disc by processing with a CAD/CAM (Computer-Aided Design/Computer-Aided Manufacturing) system.

A zirconia pre-sintered body of the present invention can be fabricated into a high-translucency sintered body even with a short firing time. A sintered body fabricated by firing a zirconia pre-sintered body of the present invention at a suitable firing temperature for a certain time period is denoted herein as a first sintered body. A sintered body fabricated by firing a zirconia pre-sintered body of the present invention at a suitable firing temperature for 120 minutes is denoted herein as a second sintered body. In a comparison of the translucency of the first sintered body and the second sintered body, the translucency of a first sintered body with 30-minute firing is preferably at least 85%, more preferably at least 90%, even more preferably at least 95% of the translucency of the second sintered body, particularly preferably essentially the same as the translucency of the second sintered body. The translucency of a first sintered body with 15-minute firing is preferably at least 85%, more preferably at least 90%, even more preferably at least 95% of the translucency of the second sintered body, particularly preferably essentially the same as the translucency of the second sintered body. As hereinbefore described, a zirconia pre-sintered body of the present invention has the time advantage for sintering. Details of translucency and the suitable firing temperature of the present invention, including the evaluation methods, will be described in the EXAMPLES section below.

In view of reproducing the shade suited for dental use, it is important in a zirconia pre-sintered body of the present invention that:

L1 be 68.0 or more and 90.0 or less,
a1 be −3.0 or more and 4.5 or less,
b1 be 0.0 or more and 24.0 or less,
L2 be 60.0 or more and 85.0 or less,
a2 be −2.0 or more and 7.0 or less,
b2 be 4.0 or more and 28.0 or less,
L1>L2,
a1<a2, and
b1<b2, where (L1,a1,b1) represent values of (L*,a*,b*) of the L*a*b* color system after sintering as measured at a first point falling within an interval of a length from one end of the zirconia pre-sintered body to 25% of the entire length of a straight line extending along a first direction from one end to the other end of the zirconia pre-sintered body, and (L2,a2,b2) represent values of (L*,a*,b*) of the L*a*b* color system after sintering as measured at a second point falling within an interval of a length from the other end of the zirconia pre-sintered body to 25% of the entire length of the straight line, and that:

the values of (L*,a*,b*) of the L*a*b* color system after sintering show unchanging patterns of increase and decrease in a direction from the first point to the second point.

Preferably, L1 is 69.0 or more and 89.0 or less, a1 is −2.7 or more and 4.0 or less, b1 is 1.0 or more and 23.5 or less, L2 is 61.5 or more and 84.5 or less, a2 is −1.5 or more and 6.5 or less, and b2 is 5.5 or more and 26.0 or less.

More preferably, L1 is 70.0 or more and 87.0 or less, a1 is −2.5 or more and 3.7 or less, b1 is 2.0 or more and 23.0 or less, L2 is 63.0 or more and 84.0 or less, a2 is −1.2 or more and 6.0 or less, and b2 is 7.0 or more and 24.0 or less.

By satisfying these ranges, the zirconia pre-sintered body can match its color with the average shade of a natural tooth.

Preferably, in a zirconia pre-sintered body of the present invention, L1-L2 is more than 0 and 12.0 or less, a2-a1 is more than 0 and 6.0 or less, and b2-b1 is more than 0 and 12.0 or less.

More preferably, L1-L2 is more than 0 and 10.0 or less, a2-a1 is more than 0 and 5.5 or less, and b2-b1 is more than 0 and 11.0 or less.

Even more preferably, L1-L2 is more than 0 and 8.0 or less, a2-a1 is more than 0 and 5.0 or less, and b2-b1 is more than 0 and 10.0 or less. Particularly preferably, L1-L2 is 1.0 or more and 7.0 or less, a2-a1 is 0.5 or more and 3.0 or less, and b2-b1 is 1.6 or more and 6.5 or less.

Most preferably, L1-L2 is 1.5 or more and 6.4 or less, a2-a1 is 0.8 or more and 2.6 or less, and b2-b1 is 1.7 or more and 6.0 or less.

By satisfying these ranges, the zirconia pre-sintered body can more preferably reproduce the shade of a natural tooth.

Figure 1:
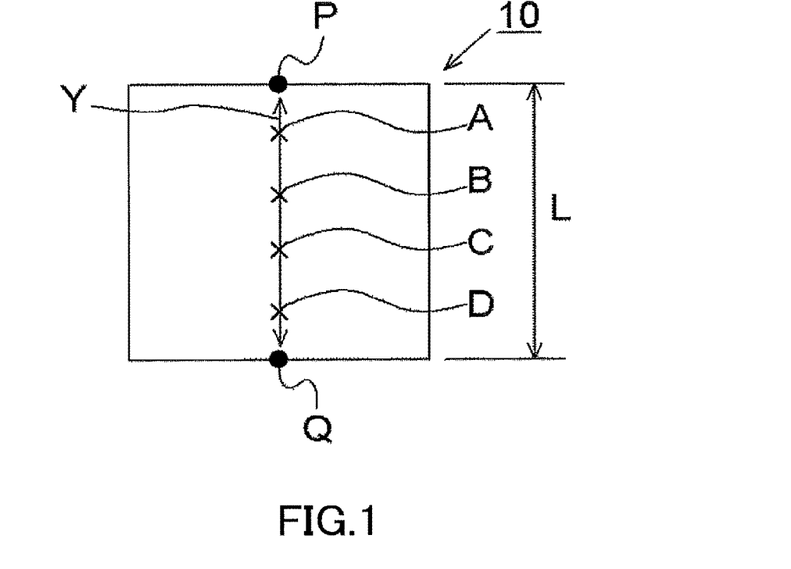
FIG. 1 is a schematic view of a zirconia sintered body.

Preferably, a zirconia sintered body obtained by firing a zirconia pre-sintered body of the present invention shows a color change from one end to the other end of the zirconia sintered body. This is described below with reference to FIG. 1, which is a schematic view of a zirconia sintered body. FIG. 1 shows a zirconia sintered body 10 with a straight line extending along a first direction Y from one end P to the other end Q. Preferably, the pattern of increase or decrease of L*, a*, and b* values does not change in the opposite direction. Specifically, when the L* value is in a pattern of decrease on a straight line from one end P to the other end Q, it is preferable that there exist no interval in which the L* value essentially increases. For example, referring to FIG. 1 showing first point A and second point D on a straight line connecting one end P to the other end Q, it is preferable that there exist no interval in which the L* value increases by 1 or more, more preferably 0.5 or more when the L* value is in a pattern of decrease from first point A to second point D on a straight line connecting first point A and second point D. When the a* value is in a pattern of increase on a straight line from one end P to the other end Q, it is preferable that there exist no interval in which the a* value essentially decreases. For example, when the a* value is in a pattern of increase from first point A to second point D on a straight line connecting first point A and second point D, it is preferable that there exist no interval in which the a* value decreases by 1 or more, more preferably 0.5 or more. When the b* value is in a pattern of increase on a straight line from one end P to the other end Q, it is preferable that there exist no interval in which the b* value essentially decreases. For example, when the b* value is in a pattern of increase from first point A to second point D on a straight line connecting first point A and second point D, it is preferable that there exist no interval in which the b* value decreases by 1 or more, more preferably 0.5 or more.

Concerning the direction of color change of the zirconia sintered body 10, it is preferable that the a* and b* values show a pattern of increase from one end P to the other end Q when the L* value is in a pattern of decrease in this direction. For example, the color changes from white to pale yellow, pale orange, or pale brown from one end P to the other end Q.

In the zirconia sintered body 10 of FIG. 1, a third point B is a point lying between first point A and second point D on a straight line connecting one end P to the other end Q. When the values of (L*,a*,b*) of the L*a*b* color system at third point B are (L3,a3,b3), it is preferable that L3 be 66.0 or more and 89.0 or less, a3 be −2.5 or more and 6.0 or less, b3 be 1.5 or more and 25.0 or less, L1>L3>L2, a1<a3<a2, and b1<b3<b2.

A fourth point C is a point lying between third point B and second point D. When the values of (L*,a*,b*) of the L*a*b* color system at the fourth point are (L4,a4,b4), it is preferable that L4 be 62.0 or more and 86.0 or less, a4 be <2.2 or more and 7.0 or less, b4 be 3.5 or more and 27.0 or less, L1>L3>L4>L2, a1<a3<a4<a2, and b1<b3<b4<b2.

In the zirconia sintered body 10 of FIG. 1, it is preferable that the first point A lie within an interval of a length from one end P to 25% of the length between one end P and the other end Q (hereinafter, referred to as "entire length"). Preferably, the third point B lies within an interval distance away from one end P by a distance of 30% of the entire length and extending no further than 70% of the entire length relative to one end P. For example, the third point B may be distance away from one end P by a distance of 45% of the entire length. Preferably, the second point D lies within an interval of a length of 25% of the entire length from the other end Q. Preferably, the fourth point C lies within an interval distance away from the other end Q by a distance of 30% of the entire length and extending no further than 70% of the entire length relative to the other end Q. For example, the fourth point C may be distance away from the other end Q by a distance of 45% of the entire length (i.e., 55% of the entire length from one end P).

Concerning the foregoing descriptions given with reference to the schematic view shown in FIG. 1, it is preferable in the present invention that "one end" and "other end" refer to a point at the cut end and a point at the base end of a zirconia pre-sintered body or a sintered body thereof, for example, when the zirconia pre-sintered body or the sintered body has a crown shape. The point may be a point on the end surface, or a point on a cross section. A point falling within an interval of a length of 25% of the entire length from one end or the other end is, for example, a point that is away from one end or the other end by a distance corresponding to 10% of the height of the crown.

When the zirconia pre-sintered body is disc-shaped, or has a shape of a hexahedron such as a cuboid, "one end" and "other end" preferably refer to points on the top surface and bottom surface (base). The point may be a point on the end surface, or a point on a cross section. A point falling within an interval of a length of 25% of the entire length from one end or the other end is, for example, a point that is away from one end or the other end by a distance corresponding to 10% of the thickness of the hexahedron or disc.

In the present invention, "first direction from one end to the other end" means a direction in which the color changes. For example, "first direction" is preferably the direction of powder lamination in the method of production described below. For example, when the zirconia pre-sintered body has a crown shape, "first direction" is preferably a direction connecting the cut end and the base end.

A zirconia sintered body of the present invention is described below. A zirconia sintered body of the present invention can be described as, for example, zirconia particles (powders) that have been sintered. Specifically, a zirconia sintered body of the present invention is a zirconia sintered body fabricated from a zirconia pre-sintered body of the present invention. The zirconia sintered body has a relative density of preferably 99.5% or more. The relative density can be calculated as a fraction of the actual density measured by the Archimedes method relative to the theoretical density.

A zirconia sintered body of the present invention includes not only sintered bodies produced by sintering molded zirconia particles under ordinary pressure or no applied pressure, but sintered bodies that have been densified by a high-temperature pressure process such as hot isostatic pressing (HIP).

The zirconia and stabilizer contents in a zirconia sintered body of the present invention are essentially the same as the zirconia and stabilizer contents in a pre-sintered body to be fabricated into a sintered body. Concerning the crystal systems of zirconia in the zirconia sintered body, the fraction $f_m$ of the monoclinic system is preferably 10% or less, more preferably 5% or less, even more preferably 0% (the monoclinic system is essentially non-existent). The crystal systems other than the monoclinic system are tetragonal and/or cubical.

Concerning the fraction of the solid solution of the stabilizer in a zirconia sintered body of the present invention, it is preferable that at least 95% of the stabilizer contained be dissolved in zirconia as a solid solution. More preferably, the stabilizer is dissolved as a solid solution essentially entirely. When the stabilizer is yttria, the percentage presence $f_y$ of undissolved yttria in a zirconia sintered body of the present invention is preferably 5% or less, more preferably 1% or less, even more preferably 0% (yttria is dissolved as a solid solution essentially entirely). The dissolution of the stabilizer (for example, yttria) in zirconia as a solid solution probably takes place in the sintering step described below.

A method for producing a zirconia sintered body of the present invention is described below. A zirconia sintered body of the present invention can be fabricated by firing a zirconia pre-sintered body at a temperature that sinters the zirconia particles (sintering step). The firing temperature in the sintering step is, for example, preferably 1,400° C. or more, more preferably 1,450° C. or more. The firing temperature is, for example, preferably 1,650° C. or less, more preferably 1,600° C. or less. The rate of temperature increase and the rate of temperature decrease are preferably 300° C./min or less.

In the sintering step, the retention time at the sinterable temperature (for example, the maximum firing temperature) is preferably less than 120 minutes, more preferably 90 minutes or less, even more preferably 75 minutes or less, yet more preferably 60 minutes or less, particularly preferably 45 minutes or less, most preferably 30 minutes or less. The retention time may be 25 minutes or less, 20 minutes or less, or 15 minutes or less. The retention time is preferably 1 minute or more, more preferably 5 minutes or more, even more preferably 10 minutes or more.

A zirconia pre-sintered body of the present invention can suppress decrease of translucency in the zirconia sintered body fabricated even with such a short firing time. With a short firing time, it is also possible to increase production efficiency, and reduce the cost of energy.

Preferably, the rate of temperature increase and the rate of temperature decrease in the sintering step are set to reduce the time required for the sintering step. For example, the rate of temperature increase may be set so that the temperature reaches the maximum firing temperature as short a time period as the performance of the firing furnace allows. The rate of temperature increase to the maximum firing temperature may be, for example, 10° C./min or more, 50° C./min or more, 100° C./min or more, 120° C./min or more, 150° C./min or more, or 200° C./min or more. The rate of temperature decrease is preferably set at a rate that does not cause defects in the sintered body, for example, such as cracking. For example, the sintered body may be allowed to cool at room temperature after heating. Here, "maximum firing temperature" means the highest temperature reached in the sintering step.

A zirconia sintered body obtained after firing of the zirconia pre-sintered body of the present invention can be suitably used as a dental product. Examples of such a dental product include copings, frameworks, crowns, crown bridges, abutments, implants, implant screws, implant fixtures, implant bridges, implant bars, brackets, denture bases, inlays, onlays, orthodontic wires, and laminate veneers. These may be produced by selecting methods that are suited for their intended use. For example, a dental product can be obtained by sintering a zirconia pre-sintered body of the present invention after milling. Preferably, the milling process uses a CAD/CAM system.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, and various changes may be made by a person with ordinary skill in the art within the technical idea of the present invention.

Examples 1 to 8 and Comparative Examples 1 and 2

Fabrication of Zirconia Pre-Sintered Body and Sintered Body

In Examples and Comparative Examples, zirconia pre-sintered bodies and sintered bodies thereof were fabricated using the following procedures.

The raw material powder used to produce zirconia pre-sintered bodies was prepared as follows. First, mixtures containing yttria in the amounts shown in Table 1 were prepared using a monoclinic zirconia powder and a yttria powder. Each mixture was added to water to prepare a slurry, and pulverized and mixed wet with a ball mill until an average particle diameter of 0.13 μm or less was achieved. After pulverization, the slurry was dried with a spray dryer, and the resulting powder was fired at 950° C. for 2 hours to prepare a primary powder. The average particle diameter can be determined by using a laser diffraction scattering method. Specifically, for the measurement using a laser diffraction scattering method, for example, a laser diffraction particle size distribution analyzer (SALD-2300, manufactured by Shimadzu Corporation) may be used with a 0.2% sodium hexametaphosphate aqueous solution used as dispersion medium.

The primary powder was divided into four groups of first to fourth powders, and pigments were added to each powder in the compositions shown in Table 1. The values of pigment contents shown in Table 1 are contents relative to the mixed powder of zirconia and yttria (100 mass %). After the addition of pigments, the powder was added to water to prepare a slurry, and pulverized and mixed wet with a ball mill until an average particle diameter of 0.13 μm or less was achieved. After pulverization, a binder was added to the slurry, and the slurry was dried with a spray dryer to prepare a secondary powder of the first to fourth powders.

The zirconia pre-sintered body was produced as follows. First, 35 g of the secondary powder of the first powder was charged into a die having inside dimensions of 82 mm×25 mm, and the surface of the first powder was leveled to provide a flat surface. On the first powder was charged 15 g of the second powder, and the surface of the second powder was leveled to provide a flat surface. In a similar fashion, 15 g of the third powder was charged onto the second powder, and the surface of the third powder was leveled to provide a flat surface. On the third powder was charged 35 g of the fourth powder, and the surface of the fourth powder was leveled. Finally, with the upper die set on the powders, the powders were subjected primary pressing at a surface pressure of 300 kg/cm² for 90 seconds, using a uniaxial pressing machine. The resulting primary press-molded body was then formed into a molded body of a four-layer structure by CIP at 1,700 kg/cm² for 5 minutes.

The molded body was fired at 1,000° C. for 2 hours to prepare a zirconia pre-sintered body. The zirconia pre-sintered body was formed into a crown shape using a CAD/CAM system (KATANA® CAD/CAM system, manufactured by Kuraray Noritake Dental Inc.). The zirconia pre-sintered body was fabricated into a zirconia sintered body by firing at 1,500° C. for 30 minutes in Example 1, and at 1,550° C. for 30 minutes in Examples 2 to 8 and in Comparative Examples 1 and 2. The zirconia sintered bodies all had a length of about 8 mm along the direction of lamination of the first to fourth powders.

Confirmation of Shade of Zirconia Sintered Body (1)

The zirconia sintered bodies of Examples and Comparative Examples were visually inspected for the comparative evaluation of their shades against the appearance of a natural tooth.

In Examples 1 to 8, the zirconia sintered bodies all had a gradient of shades from yellowish white to pale yellow, from a region corresponding to the first layer derived from the first powder to a region corresponding to the fourth layer derived from the fourth powder, and looked similar to natural teeth.

The zirconia sintered body of Comparative Example 1 had a strong red hue. The zirconia sintered body of Comparative Example 2 had a dark shade of yellow. These zirconia sintered bodies looked unnatural compared to the shade of a natural tooth, and were not necessarily close in appearance to natural teeth.

Confirmation of Shade of Zirconia Sintered Body (2)

The zirconia sintered bodies of Examples and Comparative Examples were quantitatively evaluated for their shades, as follows. For each Example and Comparative Example, the secondary powders of the first to fourth powders were individually fabricated into zirconia sintered bodies, and measured for (L*,a*,b*) in line with the L*a*b* color system (JIS Z 8781-4:2013, Color Measurements—Section 4: CIE 1976 L*a*b* color space). The (L*,a*,b*) of the individual zirconia sintered body fabricated from each powder correspond to the (L*,a*,b*) at each point of a zirconia sintered body fabricated from a laminate of the four powders. Specifically, the first, second, third, and fourth powders correspond to first point A, third point B, fourth point C, and second point D, respectively. For the measurement of (L*,a*,b*), the individual zirconia sintered body produced from each powder was fabricated into a disc plate measuring 14 mm in diameter and 1.2 mm in thickness (both surfaces were polished, #600), and measured against a white background with a spectrophotometer CM-3610A, manufactured by Konica Minolta Inc. (D65 illuminant, measurement mode SCI, measurement area Ø: illumination area Ø=8 mm:11 mm). The evaluation results are presented in Table 1.

Examples 1 to 3 and Comparative Examples 3 and 4

Fabrication and XRD Measurement of Zirconia Pre-Sintered Body

The zirconia pre-sintered body was examined for the crystal systems of zirconia, and for the extent of undissolution of stabilizer in zirconia as a solid solution. The results are presented in Table 2.

Figure 2:
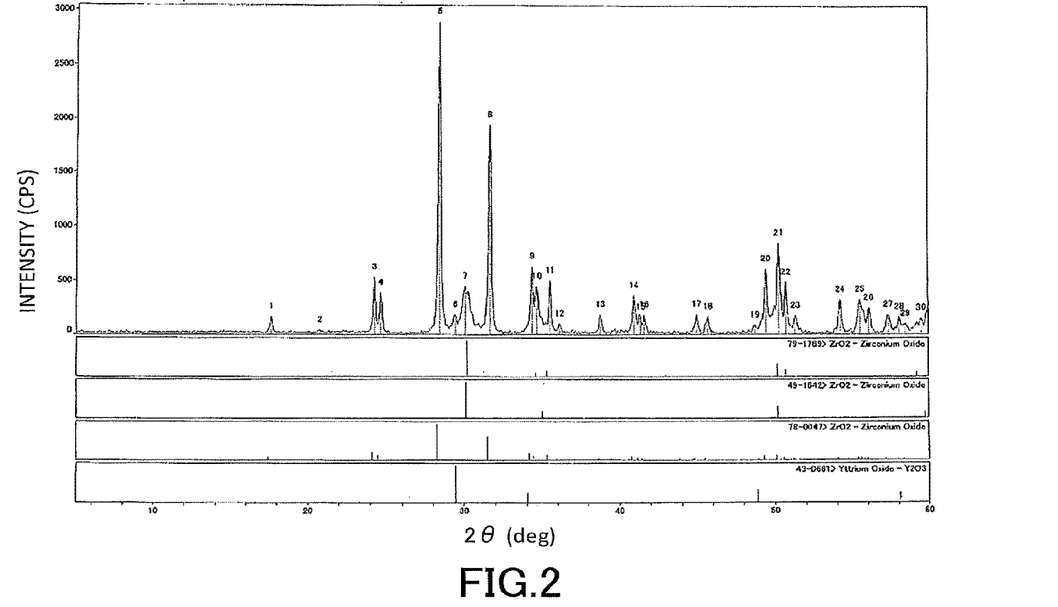
FIG. 2 shows an X-ray diffraction pattern of a pre-sintered body fabricated in Example 1.
Figure 3:
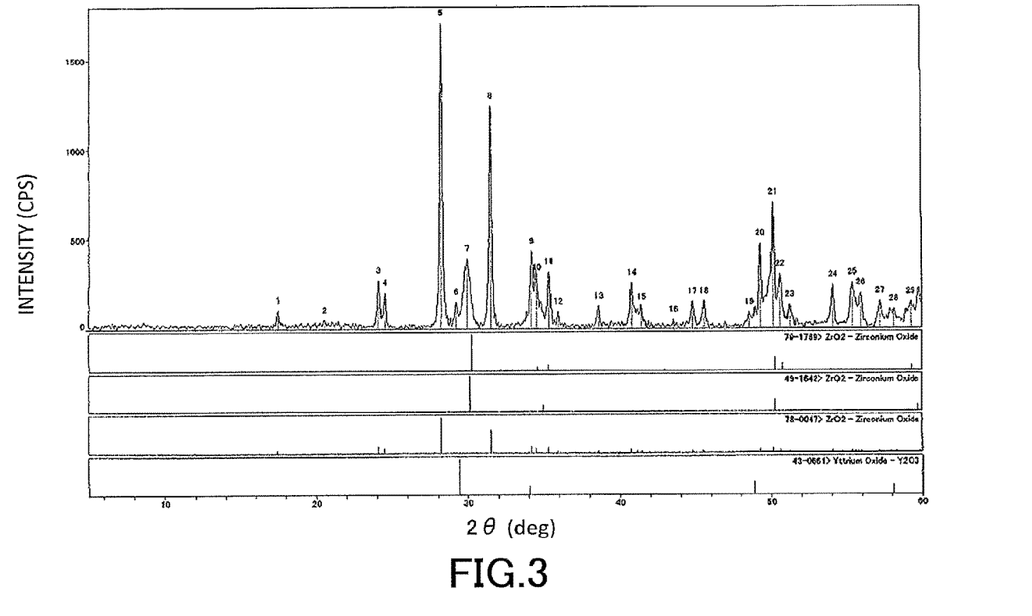
FIG. 3 shows an X-ray diffraction pattern of a pre-sintered body fabricated in Example 3.

The XRD patterns of the zirconia pre-sintered bodies of Examples 1 to 3 were measured using CuKα radiation, and $f_y$ and $f_m$ were calculated. FIG. 2 shows the XRD pattern of the zirconia pre-sintered body fabricated in Example 1. FIG. 3 shows the XRD pattern of the zirconia pre-sintered body fabricated in Example 3.

As Comparative Examples 3 and 4, commercially available partially stabilized zirconia powders were used to fabricate zirconia pre-sintered bodies using the method below, and the XRD patterns were measured for the calculations of $f_y$ and $f_m$. Comparative Example 3 used Zpex® manufactured by Tosoh Corporation. Comparative Example 4 used Zpex® Smile manufactured by Tosoh Corporation. First, 100 g of the zirconia powder was charged into a die having inside dimensions of 82 mm×25 mm, and the surface was leveled. With the upper die set, the powder was subjected to primary pressing at a surface pressure of 300

TABLE 1

Figure 4:
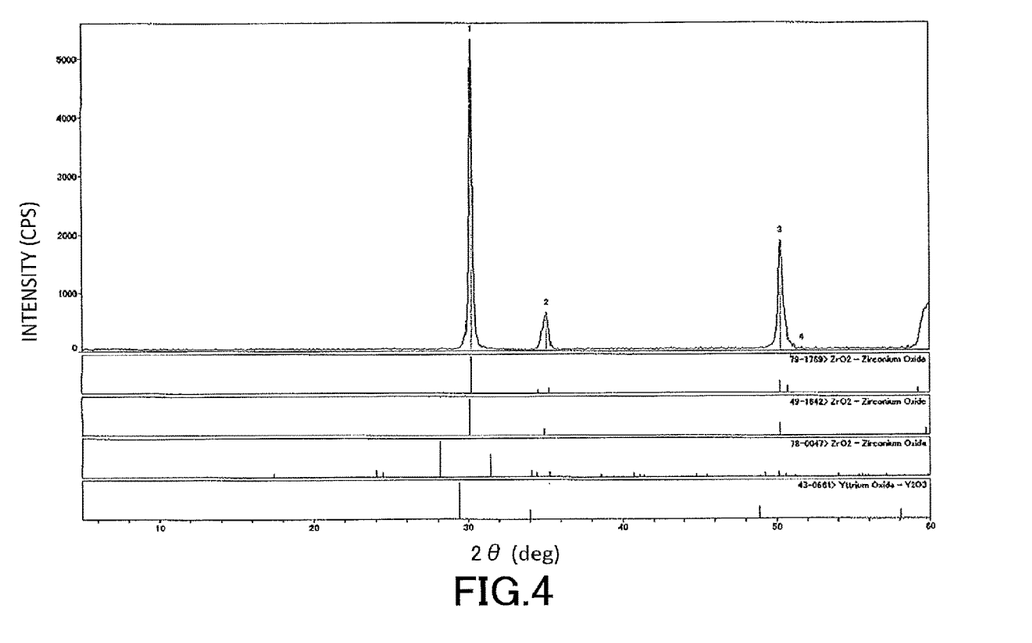
FIG. 4 shows an X-ray diffraction pattern of a pre-sintered body fabricated in Comparative Example 4.

| | | Yttria content (mol %) | Pigment content (mass %) | | | Color evaluation of sintered body | | | |
| --- | --- | --- | --- | --- | --- | --- | --- | --- | --- |
| | | | NiO | (Zr, V)O$_2$ | Cr$_2$O$_3$ | L* | a* | b* | Visual inspection |
| Ex. 1 | First powder | 4.0 | 0 | 0 | 0 | 89.5 | −1.1 | 0.6 | Good |
| | Second powder | 4.0 | 0.0010 | 0.0030 | 0 | 88.0 | −0.8 | 4.3 | |
| | Third powder | 4.0 | 0.0035 | 0.0070 | 0 | 85.5 | −0.5 | 6.5 | |
| | Fourth powder | 4.0 | 0.0040 | 0.0080 | 0 | 84.3 | 0.1 | 9.5 | |
| Ex. 2 | First powder | 5.5 | 0 | 0.0010 | 0.0007 | 86.3 | −1.0 | 4.4 | Good |
| | Second powder | 5.5 | 0.0001 | 0.0020 | 0.0015 | 85.2 | −0.7 | 6.6 | |
| | Third powder | 5.5 | 0.0002 | 0.0036 | 0.0020 | 84.5 | −0.5 | 7.8 | |
| | Fourth powder | 5.5 | 0.0003 | 0.0052 | 0.0025 | 84.1 | −0.2 | 8.6 | |
| Ex. 3 | First powder | 6.0 | 0.0060 | 0.0110 | 0.0020 | 79.0 | 0.1 | 14.0 | Good |
| | Second powder | 6.0 | 0.0070 | 0.0130 | 0.0030 | 78.0 | 0.5 | 15.3 | |
| | Third powder | 6.0 | 0.0110 | 0.0210 | 0.0040 | 75.0 | 1.8 | 17.2 | |
| | Fourth powder | 6.0 | 0.0120 | 0.0240 | 0.0050 | 73.9 | 2.3 | 17.5 | |
| Ex. 4 | First powder | 5.5 | 0 | 0 | 0 | 86.9 | −1.0 | 0.1 | Good |
| | Second powder | 5.5 | 0 | 0.0005 | 0.0005 | 86.3 | −0.8 | 1.7 | |
| | Third powder | 5.5 | 0.0001 | 0.0010 | 0.0005 | 85.8 | −0.5 | 2.7 | |
| | Fourth powder | 5.5 | 0.0001 | 0.0015 | 0.0010 | 84.8 | −0.2 | 4.3 | |
| Ex. 5 | First powder | 5.5 | 0.0093 | 0.0143 | 0 | 82.1 | −1.2 | 15.6 | Good |
| | Second powder | 5.5 | 0.0120 | 0.0185 | 0 | 81.2 | −0.7 | 17.2 | |
| | Third powder | 5.5 | 0.0144 | 0.0222 | 0 | 80.3 | −0.1 | 18.5 | |
| | Fourth powder | 5.5 | 0.0170 | 0.0245 | 0 | 79.0 | 1.0 | 20.0 | |
| Ex. 6 | First powder | 5.5 | 0.0300 | 0.0360 | 0.0030 | 68.3 | 4.2 | 18.8 | Good |
| | Second powder | 5.5 | 0.0350 | 0.0500 | 0.0040 | 65.5 | 4.9 | 19.2 | |
| | Third powder | 5.5 | 0.0470 | 0.0650 | 0.0050 | 63.8 | 6.1 | 19.8 | |
| | Fourth powder | 5.5 | 0.0520 | 0.0720 | 0.0060 | 61.9 | 6.8 | 20.5 | |
| Ex. 7 | First powder | 5.5 | 0.0060 | 0.0160 | 0 | 84.2 | −2.7 | 14.5 | Good |
| | Second powder | 5.5 | 0.0080 | 0.0190 | 0 | 83.2 | −2.3 | 16.7 | |
| | Third powder | 5.5 | 0.0090 | 0.0220 | 0 | 82.4 | −2.1 | 17.1 | |
| | Fourth powder | 5.5 | 0.0110 | 0.0250 | 0 | 81.4 | −1.8 | 18.0 | |
| Ex. 8 | First powder | 5.5 | 0.0150 | 0.0400 | 0.0010 | 79.3 | 0.6 | 23.5 | Good |
| | Second powder | 5.5 | 0.0180 | 0.0520 | 0.0014 | 78.7 | 1.6 | 24.2 | |
| | Third powder | 5.5 | 0.0210 | 0.0640 | 0.0018 | 77.8 | 2.2 | 26.3 | |
| | Fourth powder | 5.5 | 0.0240 | 0.0750 | 0.0022 | 77.4 | 2.8 | 27.4 | |
| Com. Ex. 1 | First powder | 5.5 | 0.0470 | 0.0720 | 0.0010 | 65.0 | 6.5 | 20.2 | Poor |
| | Second powder | 5.5 | 0.0520 | 0.0800 | 0.0010 | 63.2 | 7.0 | 20.9 | |
| | Third powder | 5.5 | 0.0650 | 0.0900 | 0.0020 | 61.4 | 7.8 | 21.8 | |
| | Fourth powder | 5.5 | 0.0780 | 0.1000 | 0.0020 | 59.5 | 7.9 | 22.1 | |
| Com. Ex. 2 | First powder | 5.5 | 0.0110 | 0.0250 | 0 | 81.4 | −1.8 | 18.0 | Poor |
| | Second powder | 5.5 | 0.0200 | 0.0900 | 0.0020 | 72.4 | 1.8 | 23.0 | |
| | Third powder | 5.5 | 0.0390 | 0.2000 | 0.0070 | 61.8 | 2.7 | 27.5 | |
| | Fourth powder | 5.5 | 0.0500 | 0.2400 | 0.0080 | 59.0 | 5.0 | 30.3 | | kg/cm² for 90 seconds, using a uniaxial pressing machine. The primary press-molded body was formed into a molded body by CIP performed at 1,700 kg/cm² for 5 minutes. The molded body was fired at 1,000° C. for 2 hours to fabricate a zirconia pre-sintered body. FIG. 4 shows the XRD pattern of the zirconia pre-sintered body fabricated in Comparative Example 4.

As shown in FIG. 4, the zirconia pre-sintered body of Comparative Example 4 showed no peak attributed to the monoclinic crystal of zirconia. A peak attributed to yttria was also not observable. The Comparative Example 3 produced the same results. In contrast, as shown in FIGS. 2 and 3, the zirconia pre-sintered bodies of Examples 1 and 3 showed peaks attributed to the monoclinic, tetragonal, and cubical crystals of zirconia, and the peak intensity was the highest for the monoclinic crystals. The same results were obtained in Example 2. The zirconia pre-sintered bodies of the Examples all had peaks attributed to yttria in the vicinity of 2θ=29.4° (peak number 6 in FIGS. 2 and 3), suggesting that a part of yttria was not dissolved in zirconia as a solid solution in these zirconia pre-sintered bodies.

TABLE 2

|  | Yttria content (mol %) | $f_m$ (%) | $f_y$ (%) |
| --- | --- | --- | --- |
| Ex. 1 | 4.0 | 91.0 | 2.0 |
| Ex. 2 | 5.5 | 88.6 | 3.5 |
| Ex. 3 | 6.0 | 77.9 | 3.7 |
| Com. Ex. 3 | 3.0 | 0 | 0 |
| Com. Ex. 4 | 5.3 | 0 | 0 |

Example 9 and Comparative Example 5

Measurement of Retention Ratio of Translucency against Firing Time

The zirconia pre-sintered bodies of Example 9 and Comparative Example 5 were used to fabricate zirconia sintered bodies, and the zirconia sintered bodies were examined for the relationship between translucency and the retention time at a suitable firing temperature.

Example 9 used the secondary powder of the first powder of Example 2. First, the powder was pressed into a molded body of the secondary powder after being adjusted in size to ensure that the zirconia sintered body produced in a later step upon polishing the both surfaces with a #600 paper has a thickness of 1.2 mm. The molded body was fired at 1,000° C. for 2 hours to fabricate a zirconia pre-sintered body. The specimen (zirconia pre-sintered body) was then fired at a suitable firing temperature of 1,550° C. for 120 minutes to fabricate a sintered body. Here, the suitable firing temperature is a temperature specified by the method described below. The both surfaces of the zirconia sintered body were polished with #600 paper, and the zirconia sintered body, 1.2 mm thick, was measured for translucency. The translucency of the zirconia sintered body was measured in the manner described below. Separately, specimens of zirconia pre-sintered bodies produced using the same method were fabricated into sintered bodies with different retention times of 60 minutes, 30 minutes, and 15 minutes at the suitable firing temperature (1,550° C.), and the zirconia sintered bodies were measured for translucency. The rate of temperature increase and the rate of temperature decrease are the same as in the 120-minute firing. The translucency was calculated as a ratio of a change ($\Delta L^*_x$) in the translucency of the sintered body after firing with retention time x (min) relative to a change in the translucency ($\Delta L^*_{120}$) of the sintered body fired at the suitable firing temperature for 120 minutes, using the following formula. In Comparative Example 5, the Zpex® Smile (manufactured by Tosoh Corporation) used in Comparative Example 4 was used for the measurement. The measurement was conducted in the same manner as in Example 9. The results are presented in Table 3 and FIG. 5.

Figure 5:
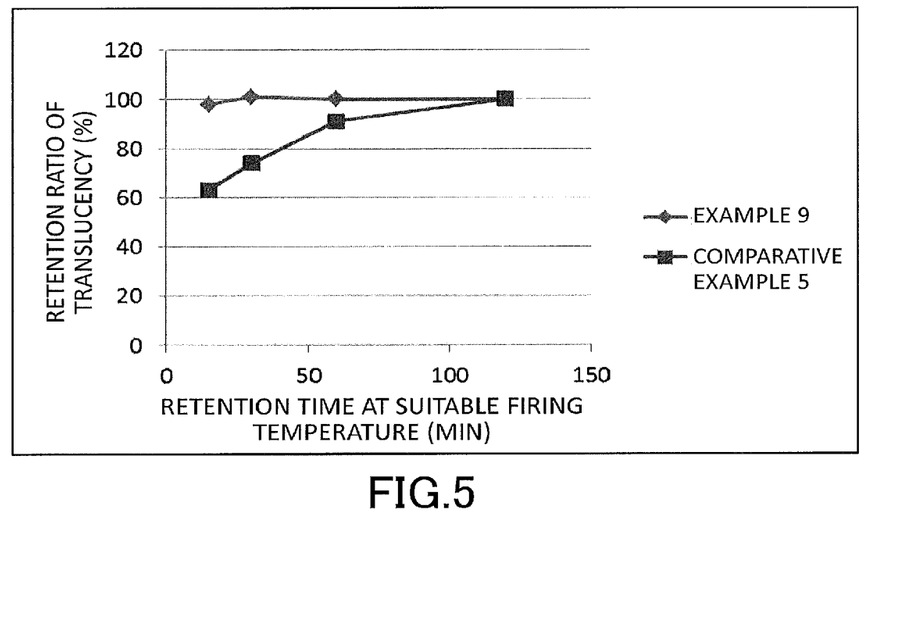
FIG. 5 is a graph representing changes in the retention ratio of translucency against retention time at a suitable firing temperature.

Retention ratio of translucency (%)=($\Delta L^*_x$)/ ($\Delta L^*_{120}$)×100

Figure 6:
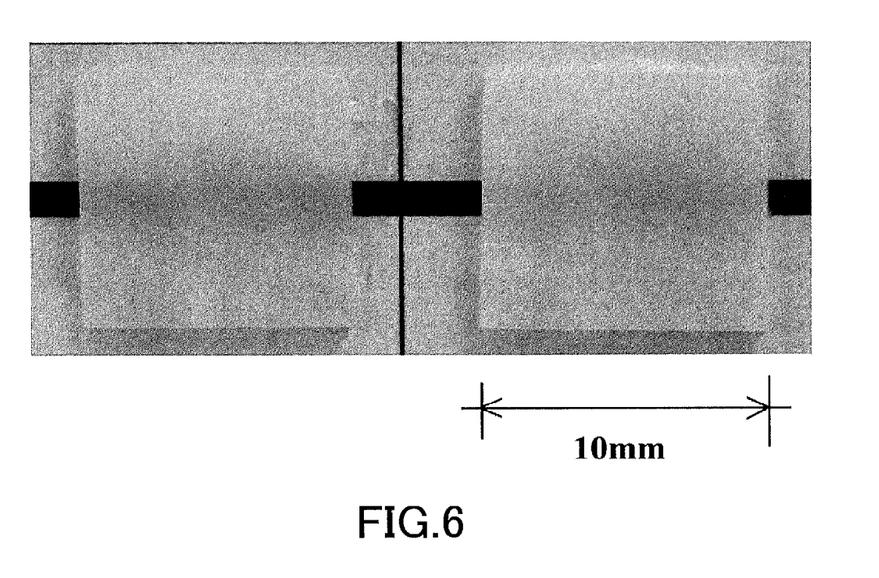
FIG. 6 is a photograph showing the appearance of zirconia sintered bodies in relation to determination of a suitable firing temperature.

In the present invention, the suitable firing temperature of zirconia is the firing temperature specified by the manufacturer when the zirconia used is a commercially available zirconia. In the absence of information specifying the firing temperature, the suitable firing temperature can be specified as follows. First, the zirconia pre-sintered body was fired for 120 minutes at different temperatures, and the both surfaces of the resulting zirconia sintered body were polished with #600 paper to obtain a specimen having a thickness of 1.2 mm. The appearance of the specimen was visually inspected, and the suitable firing temperature of each zirconia pre-sintered body was determined according to the following criteria based on the transparency of the specimen. The zirconia pre-sintered body can be determined as having been sufficiently fired when it is clear enough to show the background, as in the specimen shown on the left-hand side of FIG. 6. Firing can be determined as being insufficient when the zirconia pre-sintered body is low in transparency or clouded, as in the specimen on the right-hand side of FIG. 6. In the present invention, the lowest temperature at which the zirconia pre-sintered body can be regarded as having been sufficiently fired as in the specimen on the left-hand side of FIG. 6 was determined as the suitable firing temperature of the zirconia pre-sintered body.

The suitable firing temperatures of zirconia used in Examples and Comparative Examples were measured to be 1,500° C. for the zirconia pre-sintered body having a yttria content of 4.0 mol % (Example 1), and 1,550° C. for the zirconia pre-sintered bodies having yttria contents of 5.5 mol % and 6.0 mol % (Examples 2 to 9, and Comparative Examples 1 and 2). The firing temperature is 1,450° C. for the Zpex® and Zpex® Smile (manufactured by Tosoh Corporation) used in Comparative Examples 3 and 4, as specified by the manufacturer.

The translucency of zirconia sintered body was calculated using the L* value of the luminance (color space) of the L*a*b* color system (JIS Z 8781-4:2013, Color measurements—Section 4: CIE 1976 L*a*b*color space) measured with a spectrophotometer CM-3610A (manufactured by Konica Minolta Inc.) using D65 illuminant. The specimen was measured for first L* value—an L* value measured against a white background, and second L* value—an L* value measured for the same specimen against a black background. The translucency is the value (ΔL*) obtained by subtracting the second L* value from the first L* value.

In Comparative Example 5, the translucency decreased with decrease of the retention time at the suitable firing temperature. Specifically, the translucency values after 60 minutes, 30 minutes, and 15 minutes of firing were 91%, 74%, and 63%, respectively, of the translucency produced by 120 minutes of firing. In Example 9, the translucency values after firing with shorter retention times at the suitable firing temperature were not greatly different from the translucency produced by 120 minutes of firing. The translucency after 30 minutes of firing was almost 100% of the translucency produced by 120 minutes of firing, and the translucency after 15 minutes of firing was 95% or more of the translucency produced by 120° C. of firing. As can be seen from these results, the zirconia pre-sintered body of the present invention enables firing that can be completed with a shorter firing time while maintaining high translucency. This makes it possible to more efficiently produce a zirconia sintered body, and reduce the cost of energy. Another advantage is that the zirconia pre-sintered body of the present invention can be fabricated into a dental prosthesis without placing a large time burden on patients.

As discussed above, the crystal systems of the zirconia pre-sintered body of Comparative Example 4 used in Comparative Example 5 are tetragonal and cubical, and monoclinic crystals are essentially undetectable. Yttria is probably entirely dissolved in zirconia as a solid solution. In the zirconia pre-sintered body of Example 2 used in Example 9, the predominant crystal system of zirconia is monoclinic, and yttria partly remains undissolved as a solid solution. This difference appears to be a factor that determines the success or failure of short sintering.

A peak attributed to monoclinic crystals of zirconia was undetectable in the XRD pattern of the zirconia sintered body fabricated in Example 9. A peak attributed to yttria was also undetectable. This suggests that yttria has dissolved in zirconia as a solid solution, and a monoclinic-to-cubical phase transformation has occurred in zirconia after the firing performed for sintering.

TABLE 3

| Retention time at suitable firing temperature (min) | | 120 min | 60 min | 30 min | 15 min |
| --- | --- | --- | --- | --- | --- |
| Ex. 9 (suitable firing | Translucency | 10.3 | 10.3 | 10.4 | 10.1 |
| temperature: 1550° C.) | Retention Ratio of translucency (%) | — | 100 | 101 | 98 |
| Com. Ex. 5 (suitable firing | Translucency | 10.5 | 9.6 | 7.8 | 6.6 |
| temperature: 1450° C.) | Retention Ratio of translucency (%) | — | 91 | 74 | 63 |

In the table, suitable firing temperature is the highest firing temperature of sintering.

The numeric ranges given in this specification should be construed such that all numerical values and ranges falling within the ranges specified herein are specifically recited in the specification, even in the absence of specific recitations.

INDUSTRIAL APPLICABILITY

A zirconia pre-sintered body of the present invention and a sintered body thereof can be used as dental products such as prostheses.

REFERENCE SIGNS LIST

10 Zirconia sintered body
A First point
B Third point
C Fourth point
D Second point
P One end
Q Other end
L Entire length
Y First direction

The invention claimed is:
1. A zirconia pre-sintered body, comprising:
zirconia; and
a stabilizer capable of inhibiting a phase transformation of zirconia,
wherein the stabilizer is yttria,
wherein the zirconia is at least 55% monoclinic,
wherein the zirconia pre-sintered body has a fraction $f_y$ of more than 0 as calculated from the following formula (1),

$$f_y(\%) = \frac{I_y(111)}{I_y(111) + I_m(111) + I_m(11-1) + I_t(111) + I_c(111)} \times 100 \quad (1)$$

where $I_y(111)$ represents a peak intensity of a (111) plane of the yttria in a vicinity of $2\theta=29°$ in an X-ray diffraction pattern using CuKα radiation,
$I_m(111)$ and $I_m(11\text{-}1)$ represent peak intensities of a (111) plane and a (11-1) plane, respectively, of a monoclinic crystal system of the zirconia in the X-ray diffraction pattern,
$I_t(111)$ represents a peak intensity of a (111) plane of a tetragonal crystal system of the zirconia in the X-ray diffraction pattern, and
$I_c(111)$ represents a peak intensity of a (111) plane of a cubical crystal system of the zirconia in the X-ray diffraction pattern,
wherein the zirconia pre-sintered body meets any one of the following conditions (i)-(iii):
(i) the zirconia pre-sintered body comprises the yttria in an amount of 3 mol % or more and less than 4.5 mol %, relative to the total moles of the zirconia and the yttria, and the fraction $f_y$ is 0.5% or more;
(ii) the zirconia pre-sintered body comprises the yttria in an amount of 4.5 mol % or more and less than 5.8 mol %, relative to the total moles of the zirconia and the yttria, and the fraction $f_y$ is 1% or more;
(iii) the zirconia pre-sintered body comprises the yttria in an amount of 5.8 mol % or more and less than 7.5 mol %, relative to the total moles of the zirconia and the yttria, and the fraction $f_y$ is 2% or more, and
wherein the zirconia pre-sintered body satisfies the following conditions:
L1 is 68.0 or more and 90.0 or less,
a1 is −3.0 or more and 4.5 or less,
b1 is 0.0 or more and 24.0 or less,
L2 is 60.0 or more and 85.0 or less,
a2 is −2.0 or more and 7.0 or less,
b2 is 4.0 or more and 28.0 or less,
L1>L2,
a1<a2, and
b1<b2,
where (L1,a1,b1) represent values of (L*,a*,b*) of an L*a*b* color system after sintering as measured at a first point in an interval of a length from one end of the zirconia pre-sintered body to 25% of an entire length of a straight line extending along a first direction from one end to an other end of the zirconia pre-sintered body, (L2,a2,b2) represent values of (L*,a*,b*) of the L*a*b* color system after sintering as measured at a second point in an interval of a length from the other end of the zirconia pre-sintered body to 25% of the entire length of the straight line, and the values of (L* a* b*) of the L*a*b* color system after sintering show unchanging patterns of increase and decrease in a direction from the first point to the second point.

2. The zirconia pre-sintered body of claim 1, wherein L1-L2 is more than 0 and 12.0 or less, a2-a1 is more than 0 and 6.0 or less, and b2-b1 is more than 0 and 12.0 or less.

3. The zirconia pre-sintered body of claim 1, wherein L1-L2 is more than 0 and 8.0 or less, a2-a1 is more than 0 and 5.0 or less, and b2-b1 is more than 0 and 10.0 or less.

4. The zirconia pre-sintered body of claim 1, wherein L1-L2 is 1.0 or more and 7.0 or less, a2-a1 is 0.5 or more and 3.0 or less, and b2-b1 is 1.6 or more and 6.5 or less.

5. The zirconia pre-sintered body of claim 1, wherein the zirconia pre-sintered body satisfies the following conditions:
L3 is 66.0 or more and 89.0 or less,
a3 is −2.5 or more and 6.0 or less,
b3 is 1.5 or more and 25.0 or less,
L1>L3>L2,
a1<a3<a2, and
b1<b3<b2,
where (L3,a3,b3) represent values of (L*,a*,b*) of the L*a*b* color system after sintering as measured at a third point between the first point and the second point on a straight line connecting the first point to the second point.

6. The zirconia pre-sintered body of claim 5, wherein the zirconia pre-sintered body satisfies the following conditions:
L4 is 62.0 or more and 86.0 or less,
a4 is −2.2 or more and 7.0 or less,
b4 is 3.5 or more and 27.0 or less,
L1>L3>L4>L2,
a1<a3<a4<a2, and
b1<b3<b4<b2,
where (L4,a4,b4) represent values of (L*,a*,b*) of the L*a*b* color system after sintering as measured at a fourth point between the third point and the second point on a straight line connecting the first point to the second point.

7. The zirconia pre-sintered body of claim 6, wherein the third point is a distance of 45% of the entire length away from said one end, and the fourth point is a distance of 55% of the entire length away from said one end.

8. The zirconia pre-sintered body of claim 1, wherein at least a part of the stabilizer is undissolved in zirconia as a solid solution.

9. The zirconia pre-sintered body of claim 1, wherein the zirconia pre-sintered body further comprises a pigment, the pigment being an oxide of at least one element selected from the group consisting of Ti, V, Cr, Mn, Fe, Co, Ni, Zn, Zr, Sn, Sb, Bi, Ce, Pr, Sm, Eu, Gd, and Tb, and the zirconia pre-sintered body does not comprise erbium oxide.

10. The zirconia pre-sintered body of claim 1, wherein the zirconia pre-sintered body has an X-ray diffraction pattern with a yttria peak.

11. The zirconia pre-sintered body of claim 1, wherein the fraction $f_y$ is 15% or less.

12. The zirconia pre-sintered body of claim 1, wherein a first sintered body fabricated by firing the zirconia pre-sintered body at a highest firing temperature for 30 minutes has a first translucency that is at least 85% of a second translucency of a second sintered body fabricated by firing the zirconia pre-sintered body at said highest firing temperature for 120 minutes.

13. The zirconia pre-sintered body of claim 1, wherein a first sintered body fabricated by firing the zirconia pre-sintered body at a highest firing temperature for 15 minutes has a first translucency that is at least 85% of a second translucency of a second sintered body fabricated by firing the zirconia pre-sintered body at said highest firing temperature for 120 minutes.

* * * * *